United States Patent
Suh et al.

(10) Patent No.: US 11,884,766 B2
(45) Date of Patent: Jan. 30, 2024

(54) COMPOSITION FOR EMULSION POLYMERIZATION AND RUBBER COMPOUND PREPARED USING THE SAME

(71) Applicants: Korea Kumho Petrochemical Co., Ltd., Seoul (KR); Pusan National University Industry—University Cooperation Foundation, Busan (KR); Kwangwoon University Industry-Academic Collaboration, Seoul (KR)

(72) Inventors: Jae-Kon Suh, Daejeon (KR); Gwanghoon Kwag, Sejong-si (KR); Duseong Ahn, Daejeon (KR); Wonho Kim, Busan (KR); Kiwon Hwang, Busan (KR); Sanghoon Song, Busan (KR); Heung Bae Jeon, Seoul (KR); Jinyoung Jung, Seoul (KR); Yuyeong Kang, Seoul (KR)

(73) Assignees: Korea Kumba Petrochemical Co., Ltd., Seoul (KR); Pusan National University Industry-University Cooperation Foundation, Busan (KR); Kwangwoon University Industry-Academic Collaboration, Seoul (KR)

( * ) Notice: Subject to any disclaimer, the term of this patent is extended or adjusted under 35 U.S.C. 154(b) by 72 days.

(21) Appl. No.: 17/509,471

(22) Filed: Oct. 25, 2021

(65) Prior Publication Data
US 2022/0127404 A1 Apr. 28, 2022

(30) Foreign Application Priority Data
Oct. 23, 2020 (KR) .......................... 10-2020-0138435

(51) Int. Cl.
| | |
|---|---|
| C08F 293/00 | (2006.01) |
| C08K 3/36 | (2006.01) |
| C08F 236/06 | (2006.01) |
| C08L 9/00 | (2006.01) |
| C08F 236/10 | (2006.01) |
| C08F 2/22 | (2006.01) |

(52) U.S. Cl.
CPC ............ *C08F 293/005* (2013.01); *C08F 2/22* (2013.01); *C08F 236/06* (2013.01); *C08F 236/10* (2013.01); *C08K 3/36* (2013.01); *C08L 9/00* (2013.01); *C08F 2438/00* (2013.01); *C08F 2438/03* (2013.01)

(58) Field of Classification Search
CPC .......................... C08F 293/005; C08F 236/06; C08F 2438/03; C08F 2/38; C08F 236/10; C08F 2/22; C08F 2/44; C08F 2438/00; C08K 3/36; C08K 9/06; C08L 9/00; Y02T 10/86
See application file for complete search history.

(56) References Cited

U.S. PATENT DOCUMENTS 7,666,962 B2 * 2/2010 Le ...................... C08F 293/005
526/216

FOREIGN PATENT DOCUMENTS

KR 20200064569 A 6/2020

OTHER PUBLICATIONS

Wang et al. Deep insight into interaction mechanisms between ESBR and silica modified by different silane coupling agents, J Appl Polym Sci. 2020;137:e49112. (pdf attached) (Year: 2020).*
Erika Bicciocchi et al., "Substituent Effects on RAFT Polymerization with Benzyl Aryl Trithiocarbonates", Macromolecular Journals, 2010, pp. 529-538.

* cited by examiner

*Primary Examiner* — Marc S Zimmer
*Assistant Examiner* — Surbhi M Du
(74) *Attorney, Agent, or Firm* — NKL LAW; Jae Youn Kim

(57) ABSTRACT

Provided is a composition for emulsion polymerization which includes: an asymmetric compound represented by the following Chemical Formula 1; an aromatic vinyl monomer; and a conjugated diene-based monomer, and a rubber compound prepared from the same.

[Chemical Formula 1]

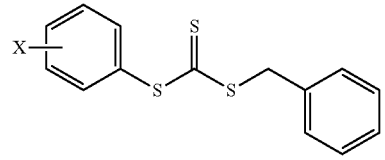

(in Chemical Formula 1, X is a C1-C10 alkoxy group.)

8 Claims, No Drawings

COMPOSITION FOR EMULSION POLYMERIZATION AND RUBBER COMPOUND PREPARED USING THE SAME

CROSS-REFERENCE TO RELATED APPLICATION

This application claims priority to and the benefit of Korean Patent Application No. 10-2020-0138435, filed on Oct. 23, 2020, the disclosure of which is incorporated herein by reference in its entirety.

BACKGROUND

1. Field of the Invention

The present invention relates to a composition for emulsion polymerization and a rubber compound prepared using the same, and more particularly, to preparing a composition for emulsion polymerization and a rubber compound with improved properties by using an asymmetric RAFT agent.

2. Discussion of Related Art

In general, higher tan δ values at 0° C. and lower tan δ values at 60° C. are advantageous. Among the two characteristics, in order to increase the tan δ values at 0° C., the volume fraction of rubber should be increased or the glass transition temperature ($T_g$) of the rubber should be increased. On the other hand, in order to reduce the tan δ values at 60° C., the volume fraction of a reinforcing filler should be reduced or the dispersion of the filler should be improved so that the distance between the filler aggregates is increased. In addition to the improvement of the above dynamic properties, it is required that abrasion resistance performance, which is a factor that may have a significant effect on tire lifetime, is not sacrificed.

As described above, the dynamic viscoelastic properties of rubber directly affect the fuel efficiency and braking performance of tires. In addition, there has been continuous research to apply the emulsion styrene-butadiene rubber (ESBR) having narrow molecular weight distribution and excellent mechanical properties to tire treads.

Among various approaches, a reversible addition-fragmentation chain-transfer polymerization technique (hereinafter referred to as "RAFT"), which is one of the controlled radical polymerization (CRP) methods, was applied to effectively narrow the broad molecular weight distribution of SBR. In the carbon black filled ESBR compounds, the abrasion resistance and fuel efficiency of a RAFT ESBR polymerized by applying dibenzyl trithiocarbonate (DBTC) as a RAFT agent were excellent as compared to those of existing ESBR. However, when the RAFT ESBR is applied to a silica-filled rubber compound, the chain of the RAFT ESBR with symmetrical structure is cleaved due to a reaction between a silane coupling agent and trithiocarbonate, resulting in unfavorable abrasion resistance and fuel efficiency performance as compared to that of existing ESBR. Therefore, it has been confirmed that there is a limitation in applying the RAFT ESBR to a silica-filled rubber compound.

SUMMARY OF THE INVENTION

The present invention is directed to applying a composition for emulsion polymerization including an asymmetric RAFT agent to a silica-filled rubber compound and thus effectively reducing the internal energy loss of the rubber compound and improving mechanical performance.

One aspect of the present invention provides a composition for emulsion polymerization including: an asymmetric compound represented by the following Chemical Formula 1; an aromatic vinyl monomer; and a conjugated diene-based monomer.

[Chemical Formula 1]

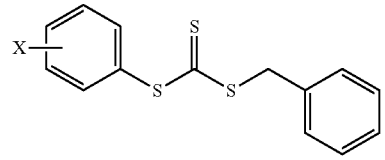

(In the above formula, X is a C1-C10 alkoxy group.)

In one embodiment, the aromatic vinyl monomer may be selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene including a tertiary amine, styrene including a primary, secondary, or tertiary amine, and a combination of two or more thereof.

In one embodiment, the conjugated diene-based monomer may be selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof.

In one embodiment, a weight ratio of the asymmetric compound, the aromatic vinyl monomer, and the conjugated diene-based monomer may be 0.5 to 1.5:15 to 45:40 to 100.

Another aspect of the present invention provides a rubber compound including the above-described composition for emulsion polymerization and silica, wherein the molecular weight distribution of the composition for emulsion polymerization is less than 3.

In one embodiment, a weight ratio of the composition for emulsion polymerization and the silica may be 70 to 130:45 to 75.

In one embodiment, the rubber compound may satisfy one or more of the following conditions (i) to (iv): (i) a Deutsche Industrie Normen (DIN) abrasion loss of 60 to 80 mg; (ii) a glass transition temperature ($T_g$) of −45 to −40° C.; (iii) a wet braking performance of 0.18 or more; and (iv) a rolling resistance of 0.10 or less.

DETAILED DESCRIPTION OF EXEMPLARY EMBODIMENTS

Hereinafter, the present invention will be described with reference to the accompanying drawings. However, the present invention can be implemented in various different forms and thus is not limited to the embodiments described herein. In the drawings, in order to clearly describe the present invention, parts irrelevant to the description are omitted, and similar reference numerals are given to similar parts throughout the specification.

Throughout the present specification, when it is stated that a part is "connected" with another part, this includes not only cases where the parts are "directly connected" with each other, but also cases where the parts are "indirectly connected" with each other through a member interposed therebetween. In addition, when it is stated that the part "includes," "comprises," or "contains" a component, this means that the part may include, rather than excluding, other additional components, unless stated explicitly to the contrary.

When a numerical value is presented in the present specification, the value has the precision of a significant figure in accordance with the standard rules of chemistry for significant figures, unless the precision of the value is specifically stated otherwise. For example, a numerical value of 10 includes numbers in the range of 5.0 to 14.9, and a numerical value of 10.0 includes numbers in the range of 9.50 to 10.49.

In the present specification, "molecular weight distribution" is a value ($M_w/M_n$) obtained by dividing weight-average molecular weight ($M_w$) by number-average molecular weight ($M_n$) and represents a form in which molecular weights are distributed in a polymer material, which is a collection of homologues having different molecular weights.

Hereinafter, exemplary embodiments of the present invention will be described in detail with reference to the accompanying drawings.

Composition for Emulsion Polymerization

One aspect of the present invention provides a composition for emulsion polymerization including: an asymmetric compound represented by the following Chemical Formula 1; an aromatic vinyl monomer; and a conjugated diene-based monomer.

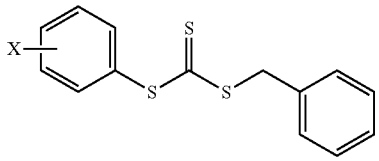

[Chemical Formula 1]

(In the above formula, X is a C1-C10 alkoxy group.)

In the asymmetric compound represented by Chemical Formula 1, X may be a C1, C2, C3, C4, C5, C6, C7, C8, C9, or C10 alkoxy group. For example, the asymmetric compound may be benzyl(4-methoxyphenyl)trithiocarbonate (BMPTC) in which X is a methoxy group having one carbon atom, but the present invention is not limited thereto.

When the composition for emulsion polymerization is used for emulsion polymerization, the growth of a copolymer does not occur in a chain on one side of the asymmetric compound where an alkoxyphenyl group is bonded, and only occurs in a chain on the opposite side of trithiocarbonate, where a benzyl group is bonded. In this case, when the synthesized copolymer is applied to a silica-filled rubber compound, the problem of an increase in molecular weight distribution due to chain cleavage caused by a reaction between a silane coupling agent and trithiocarbonate can be more effectively suppressed as compared to a copolymer polymerized from symmetric compound.

In addition, in the composition for emulsion polymerization, since a hydrophilic alkoxy group is present on one end of the asymmetric compound in the composition for emulsion polymerization, when a rubber compound is prepared using silica as a reinforcing filler, excellent dispersibility and compatibility with silica are exhibited. The properties such as, the abrasion resistance, fuel efficiency, and wet braking performance of the rubber compound can also be improved due to the functionalization effects of the alkoxy group.

The aromatic vinyl monomer may be selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethylether, vinylpyridine, vinylxylene, diphenylethylene, diphenylethylene including a tertiary amine, styrene including a primary, secondary, or tertiary amine, and a combination of two or more thereof.

The conjugated diene-based monomer may be selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof.

A copolymer polymerized from the composition for emulsion polymerization may include unit structures derived from the aromatic vinyl monomer and the conjugated diene-based monomer, and, for example, may be styrene-butadiene copolymer rubber, but the present invention is not limited thereto.

A weight ratio of the asymmetric compound and the sum of the monomers may be 0.5 to 1.5:100, and the content of the asymmetric compound may be 0.5, 0.6, 0.7, 0.8, 0.9, 1.0, 1.1, 1.2, 1.3, 1.4, or 1.5 parts by weight relative to 100 parts by weight of the sum of the monomers, but the present invention is not limited thereto. Here, the sum of the monomers refers to the sum of the aromatic vinyl monomer and the conjugated diene-based monomer. In the compounding ratio, when the asymmetric compound is included in an amount less than 0.5 parts by weight relative to 100 parts by weight of the sum of the monomers, the molecular weight distribution of the composition for emulsion polymerization cannot be effectively controlled. On the other hand, when the asymmetric compound is included in an amount of more than 1.5 parts by weight relative to 100 parts by weight of the sum of the monomers, a rubber polymerization reaction may be excessively suppressed, resulting in a decrease in productivity.

A weight ratio of the aromatic vinyl monomer and the conjugated diene-based monomer may be 15 to 40:60 to 85, for example, 15:85, 17.5:82.5, 20:80, 22.5:77.5, 25:75, 27.5:72.5, 30:70, 32.5:67.5, 35:65, 37.5:62.5, or 40:60, but the present invention is not limited thereto. When the weight ratio between the monomers does not satisfy the above range unnecessary blocks may be formed, due to a difference in reaction rate between the monomers during polymerization resulting in degradation of fuel efficiency characteristics, or the microstructure of the produced copolymer may be altered, resulting in degradation of braking characteristics.

A copolymer prepared using the composition for emulsion polymerization may have a narrow molecular weight distribution. Therefore, when the polymer is applied to a rubber compound, excellent fuel efficiency characteristics, excellent abrasion resistance, and the like can be realized.

Rubber Compound

Another aspect of the present invention provides a rubber compound including a copolymer polymerized from the above-described composition for emulsion polymerization and silica, wherein the molecular weight distribution of the copolymer is less than 3. The molecular weight distribution of the copolymer may be less than 3, for example, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or 2.9, but the present invention is not limited thereto.

When preparing a rubber compound, silica may be used as a reinforcing filler in order to increase the abrasion resistance of the rubber, lower rolling resistance, and improve fuel efficiency. Unlike a commonly used rubber which causes agglomeration due to having a low-affinity with silica, the rubber compound according to another aspect of the present invention is prepared to include the asymmetric compound including an alkoxy group on an end and thus has excellent affinity with silica. Therefore, the rubber compound can have improved abrasion resistance, rolling resistance, and fuel efficiency performance due to the reinforcing effect of silica.

A polymer having a broad molecular weight distribution includes a relatively excessive amount of small molecules having a low molecular weight, and the small molecules may lower the abrasion resistance of the rubber and cause the internal energy loss of the rubber, thereby lowering fuel efficiency. Since a copolymer polymerized from the composition for emulsion polymerization has a narrow molecular weight distribution, when it is mixed with silica to prepare a rubber compound, the molecular weight distribution of the rubber compound can also be maintained narrow, abrasion resistance and fuel efficiency can be improved.

A weight ratio of the copolymer and silica may be 100:40 to 80, and silica may be included in an amount of, for example, 40, 45, 50, 55, 60, 65, 70, 75, or 80 parts by weight relative to 100 parts by weight of the copolymer, but the present invention is not limited thereto. When silica is included in an amount less than 40 parts by weight relative to 100 parts by weight of the copolymer, the mechanical properties of the rubber compound may be degraded, and when silica is included in an amount more than 80 parts by weight relative to 100 parts by weight of the copolymer, since silica may be agglomerated processability, fuel efficiency characteristics, and abrasion resistance performance may be degraded.

Among the various mechanical properties of the rubber compound, smaller DIN abrasion loss values may mean that abrasion resistance, which is a critical factor in tire lifetime, is better. Moreover, high rubber compound glass transition temperatures ($T_g$) may mean that tan δ values at 0° C. and a coefficient of friction are high and thus braking performance is excellent. In addition, the wet braking performance of the rubber compound represented as a tan δ value at 0° C. is a factor related to driving safety, and large tan δ values at 0° C. may mean that braking performance is excellent, and the rolling resistance of the rubber compound represented as a tan δ value at 60° C. is a factor closely related to the fuel efficiency of a vehicle, and small tan δ values at 60° C. may mean that there is an advantage in terms of fuel efficiency.

The rubber compound may satisfy one or more of the following conditions (i) to (iv): (i) a DIN abrasion loss of 64 mg or more, 66 mg or more, or 68 mg or more, and 78 mg or less, 76 mg or less, or 74 mg or less; (ii) a glass transition temperature of −45° C. or more and −40° C. or less, −42° C. or less, or 44° C. or less; (iii) a wet braking performance of 0.180 or more, 0.182 or more, or 0.184 or more and 0.200 or less, 0.196 or less, 0.192 or less, or 0.188 or less; (iv) a rolling resistance of 0.050 or more, 0.060 or more, or 0.070 or more and 0.100 or less, 0.090 or less, 0.085 or less, or 0.080 or less. Since the rubber compound includes a copolymer prepared from the above-described composition for emulsion polymerization, one or more of the above conditions (i) to (iv) can be satisfied, and therefore, the above-described properties, which may be in a trade-off relationship, can be harmoniously improved.

Hereinafter, exemplary embodiments of the present invention will be described in more detail. However, the following experimental results are experimental results of only representative exemplary embodiments, and the scope and content of the present invention should not be reduced or limited by the exemplary embodiments and the like. Effects of various embodiments of the present invention not explicitly described below will be specifically described in relevant sections.

The structure of RAFT agents used in the following Examples and Comparative Examples are shown in the following Chemical Formulas 2 and 3.

[Chemical Formula 2]

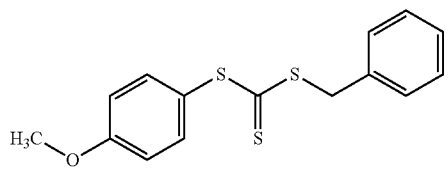

Benzyl(4-methoxyphenyl)trithiocarbonate (BMPTC)

[Chemical Formula 3]

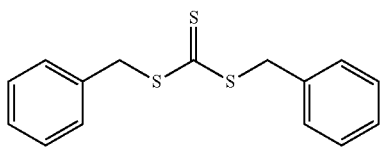

Dibenzyl trithiocarbonate (DBTC)

Example 1

At a condition of 9° C., 150 parts by weight of ion-exchanged water, 30 parts by weight of styrene, 6 parts by weight of a potassium fatty acid, 3 parts by weight of potassium rosinate, 2 parts by weight of potassium chloride, 0.1 parts by weight of sodium hydrosulfite, 0.05 parts by weight of ferrous sulfate, 0.05 parts by weight of sodium formaldehyde sulfonate, 0.8 parts by weight of benzyl-methoxyphenyl trithiocarbonate (the above Chemical Formula 2), and 0.05 parts by weight of ethylenediaminetetraacetic acid (EDTA) were introduced into a 2 L stainless steel high-pressure stirring reactor and purged with nitrogen. After adding 0.1 parts by weight of methane hydroperoxide, the reactor was again purged with nitrogen. 70 parts by weight of 1,3-butadiene were added through a gas line of the reactor. In order to calculate a conversion, total solid contents (TSC) were measured using a moisture analyzer, and when a conversion of 70% was reached, the reaction was terminated by adding a reaction terminator, and thus an emulsion polymerization copolymer was obtained.

Example 2

At a condition of 9° C., 150 parts by weight of ion-exchanged water, 30 parts by weight of styrene, 6 parts by weight of a potassium fatty acid, 3 parts by weight of potassium rosinate, 2 parts by weight of potassium chloride, 0.1 parts by weight of sodium hydrosulfite, 0.05 parts by weight of ferrous sulfate, 0.05 parts by weight of sodium formaldehyde sulfonate, 1.0 part by weight of benzyl-methoxyphenyl trithiocarbonate, and 0.05 parts by weight of EDTA were introduced into a 2 L stainless steel high-pressure stirring reactor and purged with nitrogen. After adding 0.1 parts by weight of methane hydroperoxide, the reactor was again purged with nitrogen. 70 parts by weight of 1,3-butadiene were added through a gas line of the reactor. In order to calculate a conversion, TSC was measured using a moisture analyzer, and when a conversion of 70% was reached, the reaction was terminated by adding a reaction terminator, and thus an emulsion polymerization copolymer was obtained.

Example 3

At a condition of 9° C., 150 parts by weight of ion-exchanged water, 30 parts by weight of styrene, 6 parts by weight of a potassium fatty acid, 3 parts by weight of potassium rosinate, 2 parts by weight of potassium chloride, 0.1 parts by weight of sodium hydrosulfite, 0.05 parts by weight of ferrous sulfate, 0.05 parts by weight of sodium formaldehyde sulfonate, 1.2 parts by weight of benzyl-methoxyphenyl trithiocarbonate, and 0.05 parts by weight of EDTA were introduced into a 2 L stainless steel high-pressure stirring reactor and purged with nitrogen. After adding 0.1 parts by weight of methane hydroperoxide, the reactor was again purged with nitrogen. 70 parts by weight of 1,3-butadiene were added through a gas line of the reactor. In order to calculate a conversion, TSC was measured using a moisture analyzer, and when a conversion of 70% was reached, the reaction was terminated by adding a reaction terminator, and thus an emulsion polymerization copolymer was obtained.

Comparative Example 1

At a condition of 9° C., 150 parts by weight of ion-exchanged water, 30 parts by weight of styrene, 6 parts by weight of a potassium fatty acid, 3 parts by weight of potassium rosinate, 2 parts by weight of potassium chloride, 0.1 parts by weight of sodium hydrosulfite, 0.05 parts by weight of ferrous sulfate, 0.05 parts by weight of sodium formaldehyde sulfonate, 0.8 parts by weight of DBTC (the above Chemical Formula 3), and 0.05 parts by weight of EDTA were introduced into a 2 L stainless steel high-pressure stirring reactor and purged with nitrogen. After adding 0.1 parts by weight of methane hydroperoxide, the reactor was again purged with nitrogen. 70 parts by weight of 1,3-butadiene were added through a gas line of the reactor. In order to calculate a conversion, TSC was measured using a moisture analyzer, and when a conversion of 70% was reached, the reaction was terminated by adding a reaction terminator, and thus an emulsion polymerization copolymer was obtained.

Comparative Example 2

At a condition of 9° C., 150 parts by weight of ion-exchanged water, 30 parts by weight of styrene, 6 parts by weight of a potassium fatty acid, 3 parts by weight of potassium rosinate, 2 parts by weight of potassium chloride, 0.1 parts by weight of sodium hydrosulfite, 0.05 parts by weight of ferrous sulfate, 0.05 parts by weight of sodium formaldehyde sulfonate, 1 part by weight of n-dodecyl mercaptan, and 0.05 parts by weight of EDTA were introduced into a 2 L stainless steel high-pressure stirring reactor and purged with nitrogen. After adding 0.1 parts by weight of methane hydroperoxide, the reactor was again purged with nitrogen. 70 parts by weight of 1,3-butadiene were added through a gas line of the reactor. In order to calculate a conversion, TSC was measured using a moisture analyzer, and when a conversion of 70% was reached, the reaction was terminated by adding a reaction terminator, and thus an emulsion polymerization copolymer was obtained.

The properties of the emulsion polymerization copolymers prepared in the above-described Examples and Comparative Examples are shown in the following Table 1.

TABLE 1

| Classification | Molecular weight (Mw) | Molecular weight distribution ($M_w/M_n$) | Styrene content (wt %) | Mooney viscosity ($ML_{1+4}$@ 100° C.) |
|---|---|---|---|---|
| Example 1 | 635,000 | 2.9 | 23.5 | 61 |
| Example 2 | 621,000 | 2.8 | 23.4 | 58 |
| Example 3 | 580,000 | 2.6 | 23.6 | 50 |
| Comparative Example 1 | 620,000 | 3.0 | 23.5 | 57 |
| Comparative Example 2 | 625,000 | 4.1 | 23.5 | 52 |

Referring to the above Table 1, in the case of emulsion polymerization copolymers (Examples 1 to 3) prepared using benzylmethoxyphenyl trithiocarbonate which is an asymmetric RAFT agent, it can be seen that a molecular weight distribution was effectively narrowed as compared to the case of an existing emulsion polymerization copolymer (Comparative Example 2) prepared using n-dodecyl mercaptan instead of a RAFT agent as a molecular weight regulator.

PREPARATION EXAMPLES 100 parts by weight of an emulsion polymerization copolymer prepared in the above-described Examples and Comparative Examples, 60 parts by weight of silica, 4.8 parts by weight of bis(3-triethoxysilylpropyl)tetrasulfide (TESPT), 3 parts by weight of zinc oxide, 2 parts by weight of stearic acid, and 1 part by weight of N-(1,3-dimethylbutyl)-N'-phenyl-p-phenylenediamine were sequentially added to a internal mixer (kneader). After designating 70% of the internal capacity of the kneader as an appropriate filling rate, primary kneading was performed for 12 minutes while a heating temperature was set to 110° C., an internal mixing temperature was maintained within a range of 145 to 150° C., a rotor speed of the kneader was set to 25 rpm, and the emulsion polymerization copolymer, silica, and miscellaneous additives were introduced in the order as written. A discharge temperature of the kneaded product was set to about 155° C. After subjecting the kneaded product to secondary kneading for two minutes, 1.5 parts by weight of sulfur, 1.5 parts by weight of N-cyclohexyl-2-benzothiazolesulfenamide (CBS), and 1.5 parts by weight of diphenylguanidine (DPG) were added and mixed for two minutes, and thus a rubber compound specimen was obtained.

The compositions of the rubber compounds prepared in the above-described Preparation Examples are shown in the following Table 2.

TABLE 2

| Classification | Preparation Example 1 | Preparation Example 2 | Preparation Example 3 | Comparative Preparation Example 1 | Comparative Preparation Example 2 |
|---|---|---|---|---|---|
| Example 1 | 100 | — | — | — | — |
| Example 2 | — | 100 | — | — | — |
| Example 3 | — | — | 100 | — | — |
| Comparative Example 1 | — | — | — | 100 | — |
| Comparative Example 2 | — | — | — | — | 100 |
| Silica | 60 | 60 | 60 | 60 | 60 |
| Silica coupling agent | 4.8 | 4.8 | 4.8 | 4.8 | 4.8 |
| Zinc oxide | 3 | 3 | 3 | 3 | 3 |
| Stearic acid | 2 | 2 | 2 | 2 | 2 |
| Antioxidant | 1 | 1 | 1 | 1 | 1 |
| Sulfur | 1.5 | 1.5 | 1.5 | 1.5 | 1.5 |
| CBS | 1.5 | 1.5 | 1.5 | 1.5 | 1.5 |
| DPG | 1.5 | 1.5 | 1.5 | 1.5 | 1.5 |

(Units: parts by weight)

EXPERIMENTAL EXAMPLES

Mooney viscosity ($ML_{1+4}$@100° C.): Measured with a Mooney viscometer (manufactured by Vluchem IND Co., Korea) in accordance with ASTM D1646.

Mechanical properties: In accordance with ASTM D412, a modulus at 100% elongation (M100%), a modulus at 300% elongation (M300%), and elongation at break were measured using a universal testing machine (UTM) (KSU-05M-C, KSU Co., Korea). The UTM is an instrument that allows the measurement of mechanical properties by stretching a specimen at a rate of 500 mm/min with a force of 500 N.

DIN abrasion loss: In accordance with Deutsche Industrie Normen (DIN) 53516, a cylindrical specimen having a diameter of 16 mm and a thickness of 8 mm was prepared. The specimen was abraded at a speed of 40 rpm up to a distance of 40 m using a DIN abrasion resistance tester, and then the amount of reduction in mass was measured.

Dynamic Mechanical Thermal Analysis (DMTA): Using a dynamic mechanical thermal analyzer (DMTA) (EPLEXOR 500 N, NETZSCH-Gerätebau GmbH, Germany), the dynamic viscoelastic properties (tan δ) and glass transition temperature ($T_g$) of each specimen were measured with a strain of 30 μm at a frequency of 10 Hz. The measurement was carried out in the tension mode in a temperature range of −80° C. to 70° C. while raising the temperature at a rate of 3° C./min.

The properties of each of the rubber compound specimens prepared in the above-described Preparation Examples were measured and are shown in the following Table 3.

TABLE 3

| Classification | Preparation Example 1 | Preparation Example 2 | Preparation Example 3 | Comparative Preparation Example 1 | Comparative Preparation Example 2 |
|---|---|---|---|---|---|
| Mooney viscosity ($ML_{1+4}$@100° C.) | 116 | 108 | 94 | 105 | 99 |
| $t_{10}$ (minute:second) | 2:17 | 2:28 | 2:70 | 2:55 | 3:16 |
| $t_{90}$ (minute:second) | 5:39 | 5:60 | 6:32 | 6:02 | 6:40 |
| $T_{min}$ (Nm) | 0.34 | 0.33 | 0.30 | 0.28 | 0.29 |
| $T_{max}$ (Nm) | 1.87 | 1.84 | 1.80 | 1.86 | 2.14 |
| Tmax − Tmin (Nm) | 1.53 | 1.51 | 1.50 | 1.58 | 1.85 |
| M100% (kgf/cm$^2$) | 26 | 24 | 22 | 21 | 20 |
| M300% (kgf/cm$^2$) | 87 | 86 | 85 | 64 | 74 |
| Elongation at break (%) | 652 | 662 | 670 | 688 | 632 |
| DIN abrasion loss (mg) | 70 | 71 | 72 | 85 | 79 |
| Glass transition temperature ($T_g$) (° C.) | −44.5 | −44.6 | −44.8 | −46.0 | −47.2 |
| tan δ@0° C. | 0.188 | 0.185 | 0.184 | 0.177 | 0.168 |
| tan δ@60° C. | 0.079 | 0.080 | 0.079 | 0.108 | 0.098 |

Referring to Table 3, in the case of the specimens of the rubber compounds of Preparation Examples 1 to 3 in which the rubber compounds were prepared by synthesizing an emulsion polymerization copolymer using benzylmethoxyphenyl trithiocarbonate as a RAFT agent and reinforced with silica, energy loss was effectively reduced and, as compared to the case of Comparative Preparation Examples 1 and 2, abrasion resistance performance, fuel efficiency performance, and braking performance were improved at the same time.

According to one aspect of the present invention, since the composition for emulsion polymerization has a narrow molecular weight distribution, the internal energy loss of a rubber compound prepared using the same can be effectively reduced.

According to another aspect of the present invention, when the composition for emulsion polymerization is applied to a silica-filled rubber compound, the problem of molecular weight reduction caused by a silane coupling agent can be solved.

According to still another aspect of the present invention, a rubber compound having improved abrasion resistance performance, fuel efficiency performance, and wet braking performance due to functionalization effects can be provided.

However, the effects of the present invention are not limited to the above effects and should be understood to include all effects that can be inferred from the configuration of the invention described in the detailed description of the present invention or the appended claims.

The above description of the present invention is only for illustrative purposes, and those of ordinary skill in the art to which the present invention pertains should understand that the present invention can be easily implemented in other specific forms without changing the technical spirit or essential features of the present invention. Accordingly, it should be understood that the exemplary embodiments described above are illustrative and non-limiting in all respects. For example, each component described in a combined form may be implemented in a distributed manner, and similarly, a component described as being distributed may also be implemented in a combined form.

The scope of the present invention is indicated by the appended claims, and all changes or modified forms derived from the meaning and scope of the claims and equivalent concepts thereof should be construed as being included in the scope of the present invention.

What is claimed is:

1. A rubber compound comprising silica and a copolymer prepared by polymerizing the composition of emulsion polymerization, comprising:
   an asymmetric compound represented by the following Chemical Formula 1,
   an aromatic vinyl monomer, and
   a conjugated diene-based monomer,

[Chemical Formula 1]

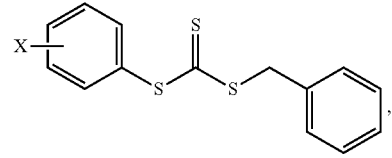

wherein X is a C1-C10 alkoxy group.

2. The rubber compound of claim 1, wherein the aromatic vinyl monomer is selected from the group consisting of styrene, a-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene including a tertiary amine, styrene including a primary, secondary, or tertiary amine, and a combination of two or more thereof.

3. The rubber compound of claim 1, wherein the conjugated diene-based monomer is selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof.

4. The rubber compound of claim 1, wherein a weight ratio of the asymmetric compound and a sum of the monomers is 0.5 to 1.5:100.

5. The rubber compound of claim 1, wherein a weight ratio of the aromatic vinyl monomer and the conjugated diene-based monomer is 15 to 40:60 to 85.

6. The rubber compound of claim 1, wherein the copolymer has a molecular weight distribution of less than 3.

7. The rubber compound of claim 1, wherein a weight ratio of the copolymer and the silica is 100:40 to 80.

8. The rubber compound of claim 1, which satisfies one or more of the following conditions (i) to (iv):
   (i) a Deutsche Industrie Normen (DIN) abrasion loss of 60 mg to 80 mg;
   (ii) a glass transition temperature (Tg) of −45° C. to −40° C.;
   (iii) a wet braking performance of 0.18 or more; and
   (iv) a rolling resistance of 0.10 or less.

* * * * *

UNITED STATES PATENT AND TRADEMARK OFFICE
CERTIFICATE OF CORRECTION

PATENT NO. : 11,884,766 B2  
APPLICATION NO. : 17/509471  
DATED : January 30, 2024  
INVENTOR(S) : Jae-Kon Suh et al.

Page 1 of 1

It is certified that error appears in the above-identified patent and that said Letters Patent is hereby corrected as shown below:

On the Title Page

(73) Assignees:  
Korea Kumba Petrochemical Co., Ltd., Seoul (KR);  
Pusan National University Industry-University Cooperation Foundation, Busan (KR);  
Kwangwoon University Industry-Academic Collaboration, Seoul (KR)

Should read:  
Korea Kumho Petrochemical Co.,Ltd., Seoul (KR);  
Pusan National University Industry-University Cooperation Foundation, Busan (KR);  
Kwangwoon University Industry-Academic Collaboration, Seoul (KR)

Signed and Sealed this  
Twenty-seventh Day of August, 2024

Katherine Kelly Vidal  
*Director of the United States Patent and Trademark Office*